June 20, 1950 — V. M. BRIDY — 2,512,135

REMOVABLE LEVEL UNIT WITH CLAMPING MEANS

Filed April 29, 1948

Victor M. Bridy
INVENTOR

BY C. A. Snow & Co.
ATTORNEYS.

June 20, 1950  V. M. BRIDY  2,512,135
REMOVABLE LEVEL UNIT WITH CLAMPING MEANS
Filed April 29, 1948  2 Sheets-Sheet 2
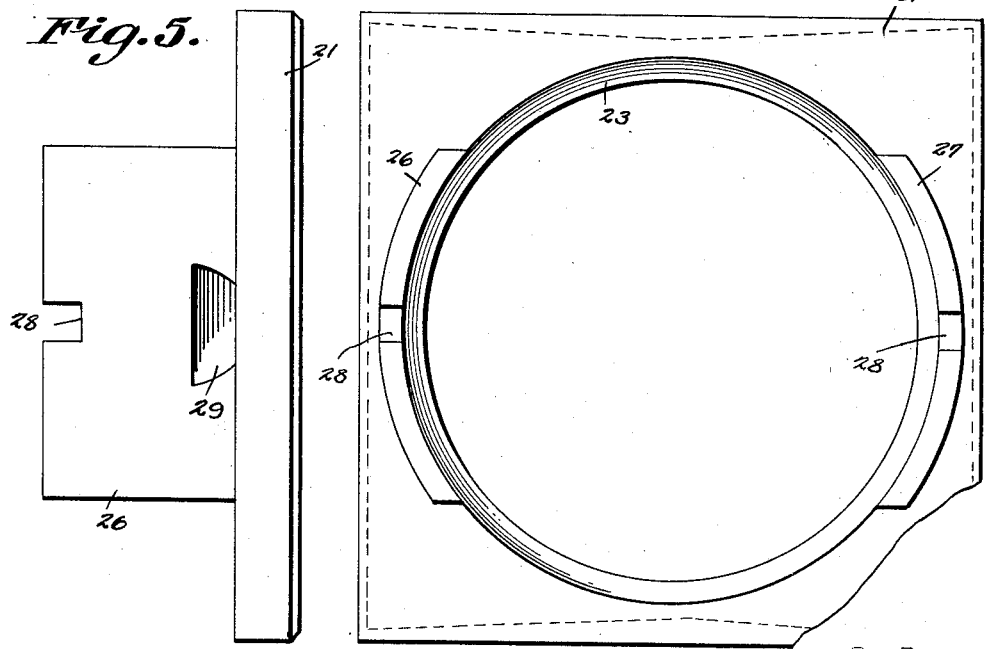
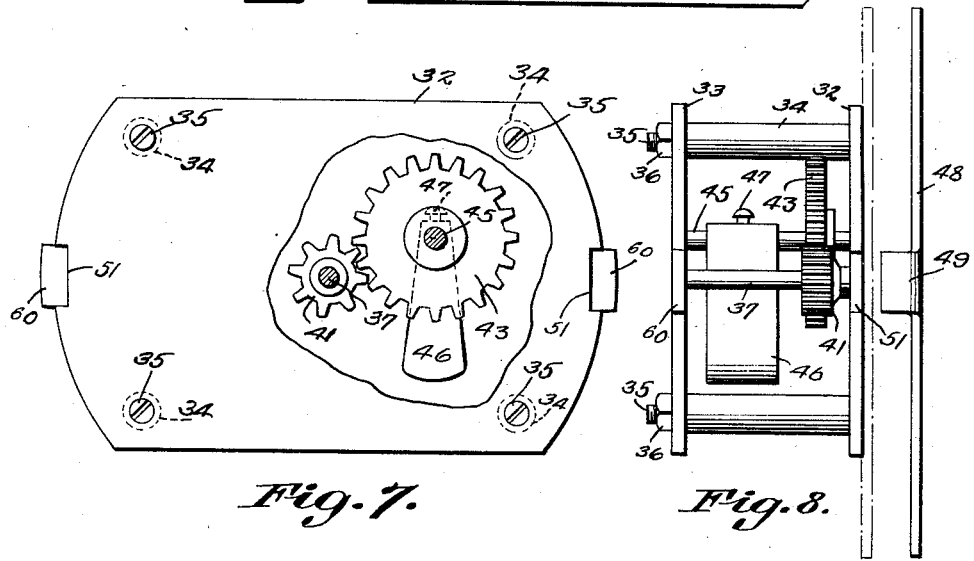
Victor M. Bridy
INVENTOR
BY [signature]
ATTORNEYS.

Patented June 20, 1950

2,512,135

UNITED STATES PATENT OFFICE 2,512,135

REMOVABLE LEVEL UNIT WITH CLAMPING MEANS

Victor M. Bridy, Atlas, Pa.

Application April 29, 1948, Serial No. 23,984

1 Claim. (Cl. 33—215)

This invention relates to improvements in degree levels.

An object of the invention is to provide an improved construction of degree level which may be readily assembled or disassembled.

Another object of the invention is to provide an improved construction of degree level which will include cooperating associated parts which will be held in assembled and operative position by means of a plurality of resilient spring retaining members.

A further object of the invention is to provide an improved degree level including a plurality of cooperating parts and an adjustable weight for correctly setting the indicating hand or pointer of the level to its proper and accurate zero degree setting.

A still further object of the invention is to provide an improved construction of degree level which will be highly efficient in operation and relatively inexpensive to manufacture and produce.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawings

Figure 5 is an edge view of the level dial cover member.

Figure 6 is a front elevation of the level dial cover member.

Figure 7 is a front view of the degree level frame back plate with part thereof being broken away to show the cooperating intermeshed level actuating gears.

Figure 8 is an edge view of the degree level frame with the dial plate shown in edge view adjacent thereto.

Like characters of reference are used throughout the following specification and the accompanying drawings to designate corresponding parts.

Figure 1:
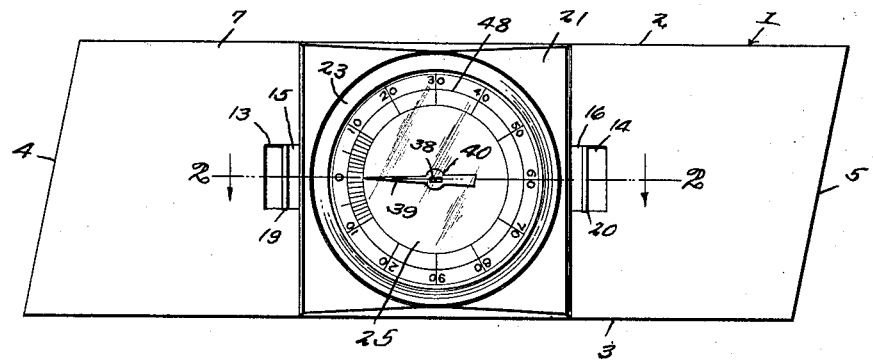
Figure 1 is a front elevation of the improved degree level shown in assembled position.
Figure 2:
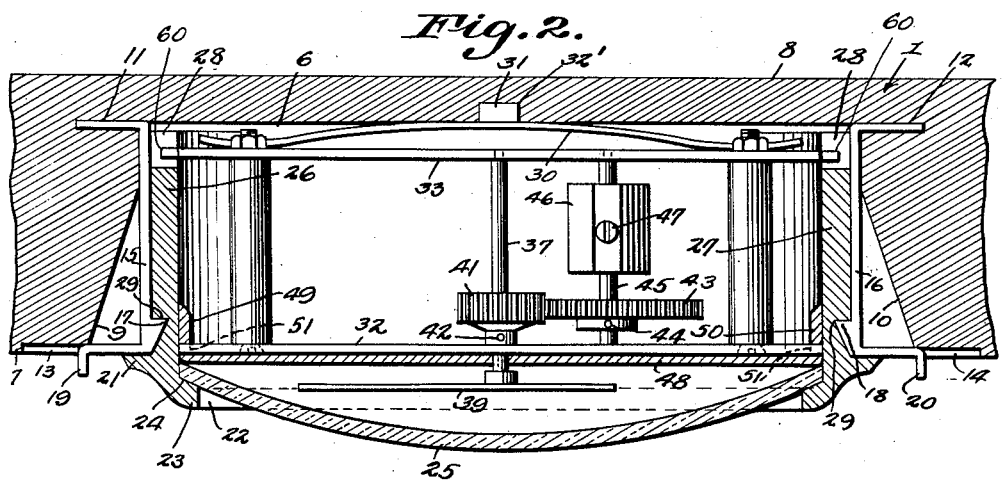
Figure 2 is a sectional view taken on the line 2—2 of Figure 1.
Figure 3:
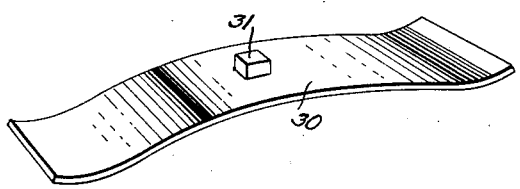
Figure 3 is a perspective view of the rear ballast or locking spring with square stud used for holding the several parts of the degree level in assembled position.
Figure 4:
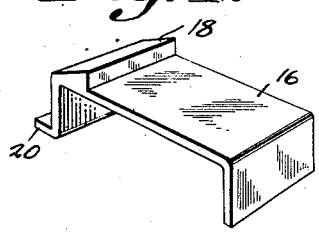
Figure 4 is a perspective view of one of the two level barrel or body securing spring members used for locking the level barrel or body in its receiving bore in the level supporting stock.

In carrying out the invention, there is provided a stock 1 in which the degree level is housed, said stock having parallel side edges 2 and 3, and end edges 4 and 5.

A bore 6 is formed in the flat side 7 of the stock 1, and extends inwardly towards the opposite flat side 8 of said stock 1 for receiving the degree level.

The outer diametrically opposed portions of the bore 6 are sloped outwardly as at 9 and 10, and undercut slots 11 and 12 are formed in diametrically opposed relation in the bottom of said bore 6 below the sloped wall portions 9 and 10. Opposed guide slots 13 and 14 are formed in the outer surface 7 of the stock 1 and merge with said sloped wall portions 9 and 10.

A pair of U-shaped level barrel or body securing spring members 15 and 16 are provided with oppositely disposed inwardly extending locking detents 17 and 18. The outer side arms of the members 15 and 16 are slidably received in the guide slots 13 and 14 when the inner side arms of the members 15 and 16 are secured in the diametrically opposed undercut slots 11 and 12. The outer ends of the outer side arms of the members 15 and 16 are bent outwardly as at 19 and 20 for readily engaging the same by the fingers of a hand and pushed outwardly to flex the members 15 and 16 outwardly until they engage the sloping walls 9 and 10 of the bore 6, thus releasing the locking detents 17 and 18 for disassembling the degree level.

The level dial cover member comprises an approximately square outer plate 21 in which a round opening 22 is formed, the same being surrounded by an annular flange 23 providing an annular seat 24 for the concave dial cover glass 25.

The cover member is also formed with diametrically opposed arcuate positioning walls 26 and 27 which extend inwardly therefrom, the same being formed with notches 28 in their inner edges and inwardly extending locking seats 29 in their outer surfaces in which the locking detents 17 and 18 are adapted to be received.

An arcuate rear ballast or locking spring 30 of the leaf type is provided with an integrally formed square locking stud 31 which will be received in the square bore 32' in the bottom of the bore 6 with the opposite ends of the spring disposed in the notches 28 in the walls 26 and 27 of the cover member.

The degree level frame comprises front and back plates 32 and 33 respectively, the same being secured in spaced parallel relation by means of the four spacing collars 34 through which bolts 35 are extended and secured by the nuts 36. Oppositely disposed outwardly extending ears 60 are formed on the ends of the rear plate 33 for being received in the notches 28 in the dial cover 21.

A staff 37 is mounted for rotation between the front and back plates 32 and 33, and has its outer end flattened to rectangular shape as at 38 to support the indicating pointer 39 formed with a similar shaped opening 40 to receive the end 38, thus firmly holding the same in fixed position upon the staff 37. A gear 41 is secured by the pin 42 upon the staff 37 and meshes with the larger gear 43 secured by the pin 44 upon the staff 45 rotatably mounted between the front and back plates 32 and 33. A weight 46 is adjustably secured upon the staff 45 by means of the set screw 47.

A calibrated dial 48 is supported in contact with the front plate 32, and is formed with the oppositely disposed inwardly extending positioning ears 49 and 50 for being received within the notches 51 formed in the opposite ends of the front plate 32.

From the foregoing description, it will be seen that there has been provided a highly efficient form of degree level which may be readily assembled and disassembled.

While the preferred embodiment of the instant invention has been illustrated and described, it will be understood that it is not intended to limit the scope of the invention thereto, as many minor changes in detail of construction may be resorted to without departure from the spirit of the invention.

What is claimed is:

In a degree level, a stock having a level-receiving opening formed therein, a level dial cover member having recesses in the wall thereof providing locking seats, a wall of the opening having slots extending inwardly from one edge thereof, the rear wall of each slot being sloped outwardly towards the outer edges thereof, spring members anchored within the slots, the outer ends of the spring members being extended laterally providing finger pieces, locking detents on the spring members extending into the locking seats removably securing the level dial within the level-receiving opening, and a locking spring engaging the wall of the level-receiving opening and level held therein, forcing the level outwardly against the locking detents securing the level within said level opening.

VICTOR M. BRIDY.

REFERENCES CITED

The following references are of record in the file of this patent:

UNITED STATES PATENTS

| Number | Name | Date |
|---|---|---|
| 397,010 | Lewis | Jan. 29, 1889 |
| 632,182 | Hodge | Aug. 29, 1899 |
| 1,175,327 | Word | Mar. 14, 1916 |
| 1,430,535 | Cocayne | Oct. 3, 1922 |
| 1,957,897 | Micek | May 8, 1934 |
| 2,257,996 | Baker | Oct. 7, 1941 |